United States Patent [19]

Mizoguchi et al.

[11] 4,260,424

[45] Apr. 7, 1981

[54] METHOD FOR PREPARING A PIGMENT COMPOSITION

[75] Inventors: Naoji Mizoguchi; Eiichi Takama; Kazuo Kaneko, all of Tokyo, Japan

[73] Assignee: Toyo Ink Manufacturing Co., Ltd., Tokyo, Japan

[21] Appl. No.: 67,376

[22] Filed: Aug. 17, 1979

[30] Foreign Application Priority Data

Aug. 28, 1978 [JP] Japan ................................ 53/103823

[51] Int. Cl.³ ................................................ C08J 3/20
[52] U.S. Cl. ................................ 106/309; 106/288 B; 106/308 M; 260/29.6 PM
[58] Field of Search .......... 260/29.6 PM; 106/308 M, 106/288 B, 309

[56] References Cited

U.S. PATENT DOCUMENTS

| 3,925,096 | 12/1975 | Karkov | 106/308 M |
|---|---|---|---|
| 3,980,602 | 9/1976 | Jakubauskas | 106/308 Q |
| 4,001,035 | 1/1977 | Ito et al. | 106/308 M |
| 4,036,652 | 7/1977 | Rothmayer | 106/308 M |
| 4,058,499 | 11/1977 | Sekmakas et al. | 260/29.6 RW |
| 4,155,773 | 5/1979 | Ferrill, Jr. | 106/309 |

FOREIGN PATENT DOCUMENTS

| 46-932 | 9/1971 | Japan . | |
|---|---|---|---|
| 52-6746 | 1/1977 | Japan . | |
| 699185 | 8/1950 | United Kingdom | 106/309 |
| 856314 | 11/1958 | United Kingdom | 106/309 |
| 856524 | 11/1958 | United Kingdom | 106/309 |
| 1224627 | 3/1971 | United Kingdom | 106/309 |

*Primary Examiner*—O. R. Vertiz
*Assistant Examiner*—Mark Bell
*Attorney, Agent, or Firm*—George A. Loud

[57] ABSTRACT

A method for preparing a resinous pigment composition is disclosed which method includes charging pigment, water and water-insoluble resin which is solid at room temperature into a mill containing a dispersing medium and milling the charge at a temperature below the softening point of the resin to reduce the pigment to a fine powder and to disperse it uniformly throughout the resin.

8 Claims, No Drawings

METHOD FOR PREPARING A PIGMENT COMPOSITION

BACKGROUND OF THE INVENTION

The present invention relates to a method for preparing a pigment composition, more particularly, to a novel method for preparing a pigment composition containing pigment highly concentrated and thoroughly-dispersed, in the form of fine particles, in a vehicle.

Pigments are used in various coloring materials such as paints, printing inks, colorants for plastic and textile printing pastes. The degree of dispersion of the pigment in the vehicle considerably affects color tone, tinting strength, hiding power, clearness, transparency and physical properties and, therefore, it is necessary to thoroughly disperse the pigment in the form of fine particles in the coloring material. For this purpose, a pigment composition containing, in a high concentration, a thoroughly-dispersed pigment in the form of fine particles is conventionally prepared in advance and such a concentrate is then used to form various coloring materials.

Conventional methods for preparing pigment compositions include (1) a method of milling pigment and its dispersing media (resin, plasticizer, solvent, etc.) by means of a 2-roller mill and (2) a method in which a pressed cake of pigment, solvent and vehicles is kneaded together and during such rolling or kneading operation, the pigment is transferred to the vehicles and distributed therein. However, such conventional methods are accompanied by various drawbacks. Method (1) is not only uneconomical as it requires enormous energy and time to disperse pigment but also it creates unfavorable working conditions as pigment is scattered and solvent is evaporated into the workshop atmosphere. On the other hand, method (2) is incapable of providing a sufficient degree of dispersion and thus requires an additional dispersion step involving a dispersing apparatus such as a 3-roller mill. Method (2) also requires a cumbersome post-treatment of waste water which contains surfactant or solvent generally added as a flashing agent.

SUMMARY OF THE INVENTION

The present inventors have now invented a novel method for providing a pigment composition in which the degree of dispersion and the concentration of the pigment are high and which has excellent versatility.

More specifically, the present invention provides a method for preparing a pigment composition, which method comprises dispersing pigment, water and a water-insoluble resin which is solid at room temperature, at a temperature below the softening point of the resin in a mill containing a dispersing medium.

DESCRIPTION OF THE PREFERRED EMBODIMENTS

The present invention is not limited to the use of any specific pigment. Suitable pigments include, for example, various organic pigments such as phthalocyanine-, quinacridone-, azo-, quinophthalone-, dioxane-, anthraquinone-, and isoindolinone-type pigments, a wide variety of inorganic pigments such as titanium white, red oxide, iron blue, zinc white, lithopone, chromium yellow, barium sulfate and calcium carbonate and carbon black.

In the present invention, the resin is selected from those which are water-insoluble, solid at room temperature and do not soften at the time of dispersion of the pigment thereinto. With water-soluble resin, a desirable degree of dispersion cannot be achieved and processability suffers due to increased viscosity of the composition system. With resin which softens at the time of dispersion, pigment adheres to the surfaces of the resin in the form of coarse particles and no further division and dispersion is feasible. In the present invention, by employing water-insoluble resin which is solid at room temperature and by dispersing said resin in water at a temperature at which said resin does not soften, it is assumed that the pigment in the form of coarse particles is finely divided before adhering to the resin while the viscosity of the composition system remains constant, and that only the pigment which has been reduced to a sufficient degree of fineness adheres the surfaces of the solid resin. The adhering fine particles eventually migrate into the interior of the resin by the so-called solid state flashing phenomenon. For a more detailed explanation of "flashing", reference is made to the *Printing Ink Manual*, ed. R. F. Bowles et al, W. Heffer & Sons Ltd. (Cambridge 1961), the teachings of which are incorporated herein by reference.

Suitable resins include, for example, naturally-occurring resins such as rosin, copal and shellac; modified natural resins such as rosin ester, sucrose benzoate and cellulose acetate butylate; and a wide variety of synthetic resins such as phenolic resins, melamine resins, urea resins, polyester resins, polyolefin resins, polyamide resins, ketone resins, xylene resins, acrylic resins, silicone resins and vinyl resins. It is desirable to choose the resin in accordance with its compatibility with the resin and solvent of the coloring material medium for which it is intended, i.e., paint, printing ink, plastic colorant or texitile printing paste, and in accordance with its effects on the physical properties of the product to be obtained. Rosin and its modified products as well as ketone resins and xylene resins are particularly useful for their wide applicability.

It is generally desirable to increase the pigment content in a pigment composition as much as possible from the viewpoints of economics and versatility. As the pigment content becomes low, more pigment composition will be required to impart a predetermined color value. This also means that more resin must be introduced into the coloring material medium, thereby in some instances modifying the physical properties of the coloring material. On the other hand, as the pigment content becomes high, the pigment composition becomes less homogeneous due to difficulties in dispersing the pigment thoroughly within the composition.

In the present invention, the preferred weight ratio of pigment to resin ranges from about 100:15 to about 60:40. Therefore, by the present invention, the preferred range allows a pigment content as high as about 85% by weight. On the other hand, in pigment compositions prepared in accordance with conventional methods, the maximum pigment content ranges only 40–55% by weight for organic pigment and 60–65% by weight even for inorganic pigment.

The pigment composition prepared in accordance with the present invention, which composition contains pigment in a high concentration, exhibits little effect attributable to its resin component when it is used in various coloring materials, because of the relatively low content of the resin component in the pigment composition. It thus possesses wide applicability and it is extremely advantageous from an industrial point of view.

The dispersing apparatus to be employed for the method of this invention may be selected from a wide variety of dispersing apparatuses which are charged with dispersing media, such as ball mills, pebble mills, rod mills, sand mills and pearl mills. One suitable apparatus is the "ATTRITOR" which uses a number of hard beads of, for example, about 5 mm in diameter for dispersion. In short, any mill of the type charged with a grinding medium, which is subjected to tumbling type action (tumbling mill) or otherwise agitated, may be used. The "ATTRITOR" is equipped with an agitator which agitates the beads and materials placed within the vessel and is manufactured by Mitsui-Miike Seisakusho Co., Ltd. The term "dispersing medium" as used herein means any one of the grinding media commonly used in mills such as ball mills, pebble mills, sand mills, etc. Suitable dispersing media include beads having a diameter of about 0.1–10 mm and made of glass, flint stone, stainless steel, sand, ceramics which per se are well-known in the art.

The dispersion step is carried out by optionally pre-mixing pigment, resin and water together, by introducing the thus-pre-mixed composition into a dispersing apparatus and by dispersing the same normally for a period of 10 minutes to several hours. The temperature of the mixture tends to rise during this dispersion step, and therefore, cooling may be required for a resin of a low softening point.

In the present invention, besides pigment, resin and water, it is possible to add, if desired, certain suitable additives such as surfactants, stabilizers and/or organic solvents which do not cause the resin to dissolve or swell, in amounts conforming with the above-described objects of this invention.

Upon completion of the dispersion step, the thus-obtained pigment composition may be, in some cases, employed as a final product without any further processing. For example, a pigment composition containing, as resin, alkali-soluble styrene-maleic acid resin may be employed, without the removal of water, as a pigment composition for water-base printing ink or for water-base paint by merely admixing ammonia and/or amine etc. However, for convenience in storage and/or transportation, the pigment composition is generally subjected to filtration, hot-air drying, spray-drying or freeze-drying to remove the water therefrom and to form a water-free pigment composition in the form of powder or granules as a final product. If desired, the water-free pigment composition may be formed into any suitable shape.

The present invention will be more specifically described by way of the following examples.

EXAMPLE 1

Into a one-liter "ATTRITOR" containing two kilograms of steel beads, each 0.5 cm in diameter, were introduced 94 grams of a filter cake of β-phthalocyanine (pigment content: 30% by weight; C.I. pigmemt blue 15), 250 grams of water and 19 grams of maleic acid resin modified with rosin ("PENTALYN-G", a trademark of Hercules Inc., softening point: about 135° C.). The composition was mixed for 2 hours at 230 rpm while maintaining its temperature at 80° C. After subjecting the thus-mixed composition to a filtration and subsequent drying step, 95 grams of a powder-like pigment composition containing about 60% by weight of the pigment were obtained.

Into a 200 cc-beaker, were introduced 11.6 grams of the pigment composition prepared as above, 51.4 grams of alkyd resin solution ("PHTHALKYD 133-60", a trademark of Hitachi Chemical Co., Ltd., solid portion: 60% by weight), 25.4 grams of melamine resin solution ("MELAN-22", a trademark of Hitachi Chemical Co., Ltd., solid portion: 60% by weight) and 11.6 grams of xylene. The contents were then agitated at 2000 rpm for 30 minutes by means of a high-speed impeller agitator to obtain melamine-alkyd resin coating composition (A).

As a comparative example, 200 grams of pigment obtained by drying and pulverizing the above-described filter cake of copper phthalocyanine, 500 grams of "PHTHALKYD 133-60" and 200 grams of xylene were pre-mixed, rolled six times by means of a laboratory 3-roller mill and then adjusted to obtain a coating composition (B) having the same composition as the coating composition (A).

The tinting strengths of each of the coating compositions (A) and (B) obtained as above and the gloss values of the coating film formed from each of the compositions (A) and (B) were measured, the results being shown in Table 1 below.

TABLE 1

| | Coating Composition (A) | Coating Composition (B) |
|---|---|---|
| tinting strength (K/S 0/0)* | 125 | 100 |
| gloss value (0/00)** | 98 | 92 |

*tinting strength:
One part of each coating composition was diluted with 10 parts of titanium white enamel and then applied onto a glass plate with a 4 mill-applicator. The thus-applied coating composition was thereafter baked at 140° C. for 20 minutes to form a coating film whose reflection rate was determined by means of a "SHIMAZU SPECTROPHOTOMETER D-40" (a trademark of Shimazu Seisakusho Ltd.). The tinting strength was compared in terms of the K/S value calculated in accordance with the Kubelka-Munk's equation:

$$K/S = \frac{(1 - R_\infty)^2}{2R}$$

wherein,
K: absorption factor;
S: scattering factor;
$R_\infty$: reflection rate of an infinitely thick coating film formed from a coating composition;
and
R: reflection rate of the coating film of thickness in question, formed from the coating composition
**gloss value:
Each coating composition was applied onto a glass plate by means of a 4 mill-applicator and then baked at 140° C. for 20 minutes to form a coating film whose specular reflection rate was measured for 60° by using a glossmeter "VG-105" (a trademark of Nippon Denshoku Kogyo Co., Ltd.).

EXAMPLE 2

Into a one-liter "ATTRITOR" containing 2 kilograms of steel beads (each 0.5 cm in diameter), were charged 129 grams of a filter cake of a disazo-type pigment (a filter cake of "LIONOL YELLOW NBRT" produced by Toyo Ink Manufacturing Co., Ltd., pigment content: 28% by weight), 220 grams of water and 9 grams of styrene-maleic acid resin ("HI-ROS T-21" produced by Seiko Kagaku Co., Ltd., softening point: about 130° C.). The composition was mixed at 80° C. for one hour at 230 rpm. After subjecting the thus mixed composition to a filtration and drying step, 95 grams of a powder-like pigment composition was obtained with a pigment content of 80% by weight.

Into a 200 cc-beaker, were introduced 15 grams of the pigment composition obtained as above, 117 grams of water-soluble acrylic resin solution ("AROLON "557N", produced by Nisshoku Arror Co., Ltd., solid portion: 50% by weight) and 3 grams of melamine resin ("MELAN 242B", produced by Hitachi Chemical Co., Ltd., solid portion: 98% by weight). The composition was then agitated at 2000 rpm for 30 minutes by a high-speed impeller agitator and a water-soluble melamine-acrylic resin coating composition (C) was obtained.

As a comparative example, in a 4 liter-ceramic ball mill, were dispersed 200 grams of dried "LIONOL YELLOW NBRT" and 400 grams of "AROLON 557N" for sixteen hours. The thus prepared mixture was then adjusted to render its composition identical to that of the coating composition (C), thereby forming a coating composition (D).

The coating compositions (C) and (D) were tested in the same manner as in Example 1. The coating composition (C) was found to be apparently superior to the coating composition (D) in both tinting strength and gloss value.

EXAMPLE 3

Into a 1-liter "ATTRITOR" containing 2 kilograms of steel beads (each 0.5 cm in diameter), were charged 38 grams of "TRANSOXIDE RED" (ultra-fine iron oxide particles produced by Hilton-Davis Corp.), 315 grams of water and 6.8 grams of vinylchloride-vinylacetate copolymer ("DENKA VINYL 1000G" produced by Denki Kagaku Kogyo Kabushiki Kaisha, softening point: about 87° C.). The composition was mixed at 230 rpm and 50° C. for one hour, and then filtered and dried. A powder-like pigment composition resulted with a pigment content of 85% by weight.

Into a 200 cc-beaker, were introduced 10 grams of the thus obtained pigment composition and 150 grams of varnish for gravure ink (a vinylchloride-vinylacetate copolymer in methylethyl ketone and toluene solution, produced by Toyo Ink Manufacturing Co., Ltd., solid portion: 30% by weight). The composition was mixed at 2000 rpm for 30 minutes by a high-speed impeller agitator.

As a comparative example, 200 grams of "TRANSOXIDE RED", 300 grams of "DENKA VINYL 1000G", 20 grams of methylethyl ketone and 10 grams of toluene were pre-mixed and then milled for ten minutes by means of a 2-roller mill. The mixture thus obtained was then combined with a solvent and adjusted to obtain gravure ink (B) which has the same composition as the gravure ink (A).

The gravure inks (A) an (B) were applied in accordance with a known method for printing. They provided printed materials of almost the same transparency and gloss.

EXAMPLE 4

Six parts by weight (hereinafter, the term "part" will be understood to mean parts by weight) of carbon black ("MITSUBISHI MA-8" produced by Mitsubishi Chemical Industries Co., Ltd.) and 90 parts of water were pre-mixed by a high-speed impeller agitator and then dispersed by a sand mill. The retention time of the mixture in the sand mill was 15 minutes. Then, 4 parts of phenolic resin modified with rosin (produced by Toyo Ink Manufacturing Co., Ltd. softening point: 80° C.) were added. The resultant mixture was then dispersed by a sand mill while maintaining the temperature thereof at 50° C. The retention time of the resultant mixture was 30 minutes in the sand mill. After the completion of the dispersion step, the thus dispersed mixture was filtered and dried to form a powder-like pigment composition with a pigment content of 60% by weight.

Into a 200 cc-beaker, were placed 25 grams of the thus obtained pigment composition and 75 grams of varnish for offset ink (resinous varnish produced by Toyo Ink Manufacturing Co., Ltd., solid portion: 60% by weight). The mixture was agitated at 1000 rpm, for 30 minutes by a high-speed impeller agitator while maintaining the temperature at 180° C., to form an offset ink (A).

As a comparative example, 60 grams of "MITSUBISHI MA-8" and 120 grams of the above-described offset ink varnish were pre-mixed and then milled three times by a 3-roller mill. The thus milled mixture was adjusted to obtain an offset ink composition (B) of the same composition as that of the offset ink composition (A).

The thus obtained offset ink composition (A) and (B) were employed for printing substrates in accordance with a conventional technique. The substrates printed with the offset ink composition (A) exhibited superior jetness and gloss as compared with those printed with the offset ink composition (B).

EXAMPLE 5

Ten parts of quinacridone pigment ("CONQUASIA RED Y" produced by E. I. DuPont de Nemours & Co.) and 86 parts of water were pre-mixed by a high-speed impeller agitator and then dispersed in a sand mill. The retention time of the mixture in the sand mill was 15 minutes. Thereafter, 4.3 parts of polyethylene ("A-WAX" produced by BASF, softening point: 108° C.) were added thereto. The mixture was then dispersed in a sand mill while maintaining the temperature at 50° C. The retention time of the mixture in the sand mill was 15 minutes. After the completion of the dispersion step, the resultant mixture was filtered and dried to a powder-like pigment composition with a pigment content of 70% by weight.

One and a half parts of the thus prepared pigment composition and 166 parts of low-density polyethylene ("F-2270" produced by Asahi-Dow Limited) were blended by a "SUPER MIXER" (manufactured by Kawada Seisakusho Co., Ltd.) and then extruded by a conventional method to obtain a molded product (A).

As a comparative example, 100 parts of "CINQUASIA RED Y" and 100 parts of "A-WAX" were pre-mixed and then milled three times by a heated 3-roller mill. Then, "F-2270" was added to the thus milled pre-mix. The composition of the thus prepared mixture was then adjusted to render the same identical to the pigment portion of the above-described molded product (A). Thereafter, the thus adjusted mixture was mixed further by the "SUPER MIXER" and then similarly extruded into a molded product (B).

The molded product (A) was found to be superior to the molded product (B) in both tinting strength and clearness.

What is claimed is:

1. A method for preparing a resinous pigment composition comprising:

charging pigment, water and water-insoluble resin which is solid at room temperature into a mill containing a dispersing medium without any additive which would cause said resin to dissolve or swell; and, milling the charge at a temperature below the softening point of the resin to reduce the pigment to a fine powder and to disperse it uniformly throughout the resin.

2. The method as claimed in claim 1, wherein the pigment, water and water-insoluble resin are pre-mixed prior to being charged into the mill.

3. The method as claimed in claim 1, wherein the mill is a ball mill, sand mill, pearl mill or attritor.

4. The method as claimed in claim 3, wherein the dispersing medium is beads having a diameter of 0.1 to 10 mm and made of glass, flint stone, stainless steel, sand or ceramics.

5. The method as claimed in claim 1, further comprising removing water from the thus dispersed pigment composition.

6. The method as claimed in claim 1, wherein said resin is selected from the group consisting of rosin, modified rosins, ketone resins and xylene resins.

7. The method as claimed in claim 1, wherein said resin is selected from the group consisting of maleic acid resins modified with rosin, styrene-maleic acid resins, vinylchloride-vinylacetate copolymers and phenolic resins modified with rosin.

8. A method in accordance with claim 1, 6 or 7 further comprising:
admixing the milled charge with at least one member selected from the group consisting of ammonia and amines to form a water-base paint.

* * * * *